Aug. 6, 1957     L. E. WOLINSKI     2,801,446
PROCESS FOR TREATING POLYETHYLENE STRUCTURES
AND ARTICLES RESULTING THEREFROM
Filed Nov. 29, 1952
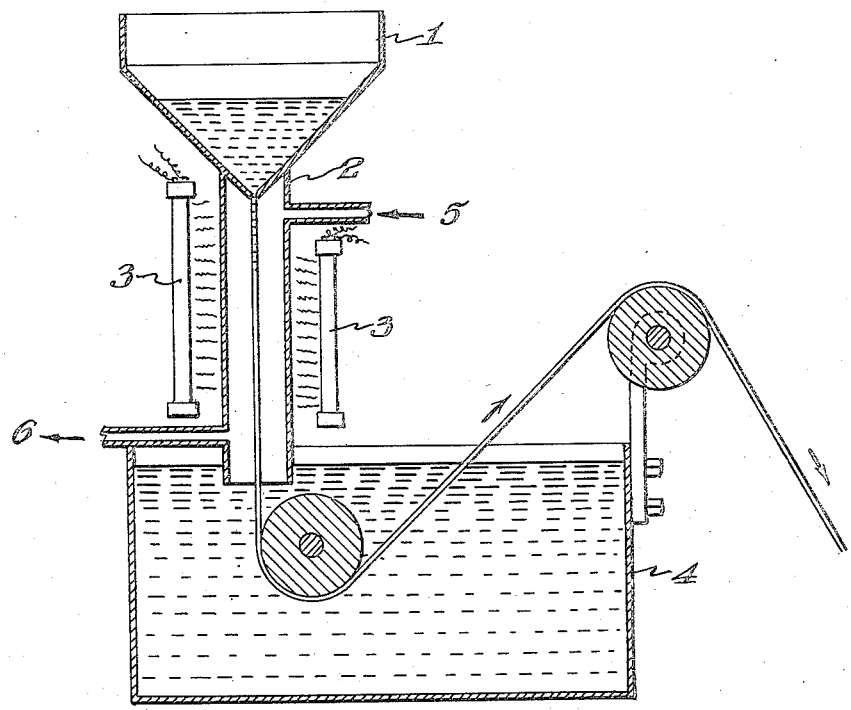
INVENTOR
LEON E. WOLINSKI
BY *A. Ralph Snyder*
ATTORNEY

United States Patent Office 2,801,446
Patented Aug. 6, 1957

2,801,446

PROCESS FOR TREATING POLYETHYLENE STRUCTURES AND ARTICLES RESULTING THEREFROM

Leon E. Wolinski, Buffalo, N. Y., assignor to E. I. du Pont de Nemours and Company, Wilmington, Del., a corporation of Delaware Application November 29, 1952, Serial No. 323,275

15 Claims. (Cl. 18—48)

This invention relates to a process of treating the surface of polyethylene structures and, more particularly, to a process of treating the surface of a polyethylene film to promote the adhesion thereto of printing inks and various other materials.

U. S. Patent 2,219,700 to Perrin et al. discloses and claims a polyethylene film, i. e., a film of a solid polymer of ethylene. In general, polyethylene films are tough, semi-transparent, resistant to many chemicals, exhibit a high degree of moisture vapor impermeability, permit the passage of oxygen, and are heat-sealable. Because of this combination of properties, polyethylene films are highly useful for packaging and wrapping a great variety of materials such as chemicals, fresh produce, dried milk, textiles, hardware, etc. Probably the only troublesome disadvantage of polyethylene film for use in the packaging field is the fact that standard aniline and rotogravure printing inks employed for printing various cellulosic films, such as regenerated cellulose and cellulose acetate films, do not adhere satisfactorily to the surface of the film. Generally, any indicia, such as trade marks, advertising indicia, recipes, etc., imprinted upon a surface of a polyethylene film with standard oil or lacquer-type inks employed for printing cellophane film are easily smeared or rubbed off by the normal abrasions suffered by packages during shipping, handling, etc. Hence, in order to obtain satisfactory adhesion between a dried ink and a polyethylene film surface, it is necessary to employ a specially compounded ink or modify the film surface to promote improved ink adhesion.

Although printing inks compounded particularly for printing on polyethylene films have been developed, the use of most of these inks requires modification of standard printing processes; and the preferred approach is treatment of the polyethylene film surface to promote adhesion of standard oil and lacquer type inks.

An object of the present invention is to provide a process of treating the surface of a polyethylene structure, e. g., film, to improve adhesion of standard printing inks, i. e., promote adhesion of standard aniline and rotogravure inks employed in printing on cellophane film. Another object is to provide a process of treating the surface of a polyethylene film to improve adhesion thereof to various other materials, such as metals, paper, nitrocellulose coatings, and other polymeric coatings, e. g., nylon, polyethylene terephthalate, etc. A further object is to improve the adhesion of polyethylene film to itself and other materials when using commercial adhesives. A still further object is to provide a process of treating the surface of a polyethylene film to improve adhesion thereto of dried ink impressions and not impair the transparency of the film. A still further object is to provide a polyethylene film having modified surface characteristics such that dried ink imprints on the surface will not rub off when tested in accordance with the various tests described hereinafter. Other objects will be apparent from the following description of the invention.

These objects are realized by the present invention which, briefly stated, comprises subjecting a polyethylene structure, e. g., film, at a temperature within the range of from about 150° to about 325° C. to the action of ozone, preferably in the presence of ultra-violet light, and thereafter quenching said structure in an aqueous quench bath containing a conditioning agent selected from the group of oxy compounds consisting of hydrogen peroxide, nitrous acid, alkaline hypochlorites, concentrated nitric acid, and mixtures of concentrated nitric acid and sulfuric acid.

It should be understood that 325° C. is not an upper limit insofar as the operability of the present invention is concerned. Extrusion of presently available polyethylene compositions at temperatures substantially higher than 325° C. is not practical because the melt is too fluid, and presently known antioxidants do not efficiently prevent degradation of the polymer at appreciably higher temperatures. With the development of polyethylene compositions which form a more viscous melt and the discovery of more efficient antioxidants, extrusion may be carried out more rapidly and efficiently at temperatures of 400° C. and above, the maximum being that temperature beyond which substantial degradation of the polyethylene composition occurs.

In the normal process of extruding molten polyethylene into film form, a molding powder or flake of polyethylene is fed continuously into a melt extrusion machine, and the molten film continuously extruded through a slot orifice and through an air gap vertically downward into a quench bath maintained at a temperature from 25°–95° C., preferably from 30°–60° C. Usually, the polyethylene is extruded from a melt maintained at a temperature within the range from 150° to 325° C. Tubing is usually extruded from a melt at a temperature within the range from 150°–200° C., whereas film is extruded at a temperature within the range from 250°–325° C. An alternative process of forming a polyethylene film comprises milling molten polymer on closely-spaced calender rolls to form a film which is conducted vertically downward into a quench bath. In either of these general methods of forming a polymeric film, the space between the point where the molten film leaves the slot orifice or the last calender roll and the point where the molten film enters a quench bath will hereinafter be termed the "air gap." During passage through the air gap, the film is merely permitted to pass uninhibited through the atmosphere, and this provides for some superficial cooling. Generally, the length of the air gap ranges from about 2" to as long as 15" in some cases.

Because of the rapid action of ozone upon the surface of the polyethylene film at elevated temperatures, the process of the present invention is most conveniently carried out by subjecting freshly extruded film at a temperature of from about 150° to about 325° C. to the action of ozone as the film passes through the air gap. For example, freshly extruded film may be treated in accordance with this invention by suitably enclosing the air gap and providing for the maintenance in the enclosure of a gaseous atmosphere, e. g., air, containing ozone. Provision may be made for the employment of ultra-violet light by making the walls of the enclosure transparent to ultra-violet light or by installing a source of ultra-violet light inside of an opaque enclosure. Hence, the process of the present invention may be carried out by making very simple modifications to existing film-forming or tube-forming apparatus; and, owing to the rapid action of ozone, employment of the present process does not preclude production of film at commercially satisfactory rates. Normally, in order that polythene film may be treated in accordance with the present invention as part of presently employed extrusion or calendering techniques of forming the film, the time of treatment in the air gap should be no greater than about 2 seconds in order to permit operation at commercially acceptable rates. Treating chambers longer than the normal air gap spacing, i. e., usually 5–10", may be employed to allow for longer treatment with ozone. Futhermore, the path of film travel in the quench bath may be lengthened to increase the time of treatment with the oxy-compound.

Treatment of the film maintained at an elevated temperature is essential for obtaining rapid modification of the film surface with ozone. Normally, treatment at temperatures substantially below 150° C. does not provide for obtaining rapid action with ozone.

Any conditioning agent selected from the group of oxy compounds consisting of hydrogen peroxide, nitrous acid, alkaline hypochlorites, concentrated nitric acid and a mixture of concentrated nitric acid and sulfuric acid may be employed in the quench bath for purposes of this invention. The conditioning agents may be employed in the quench bath in varying concentrations as illustrated in the examples presented hereinafter. Hydrogen peroxide has been employed in concentrations ranging from 0.24% to 32%, by weight of the total bath; and higher and somewhat lower concentrations are entirely operable. The same applies to the alkaline hypochlorites, but about 30% or higher is preferred. When nitric acid or mixtures thereof with sulfuric acid are used, the concentrated acids are preferred. Following the treatment with these agents, the polyethylene film is passed into an alkaline neutralizing bath, such as aqueous sodium hydroxide; and thereafter the film is washed in water.

For obtaining the desired physical characteristics in the polyethylene film, the quench bath is normally maintained at a temperature between 25° and 65° C. However, if the physical properties of the resulting film are not impaired or reduced below the minimum requirements for particular end uses, the use of higher quench bath temperatures, e. g., up to 90–95° C., permits shorter treatment with ozone. In general, quench bath temperatures substantially higher than 65° C. do not sufficiently quench the film; and with slower cooling effected by higher bath temperatures, the polyethylene film formed is generally more crystalline and, consequently, has lower strength properties, lower flexibility and transparency, and the bond strengths of heat seals are considerably lower. Hence, quenching bath temperatures should be maintained below 65° C.

For effective action within the relatively short exposure times permissible in the treatment of film being extruded at commercially acceptable rates, the concentration of ozone in the treating atmosphere must be at least 0.05% by volume, of the total volume of gases present in the treating gases. The use of ozone concentrations substantially greater than 5%, by volume of the total gases surrounding the film, is not particularly practical because of the restricted capacity of present-day ozone generating equipment. This applies to continuous treatment of film wherein the ozone-containing gas, e. g., air, is passed continuously through the treating chamber; and additional ozone is injected into the out gases which are then recirculated. Ozone concentrations as high as 10% do not tend to "burn" the film, i. e., impair transparency or semi-transparency of the film, so long as the time of treatment or exposure is not excessive.

Preferably, ultra-violet light having a wave length no greater than 3900 A. U. is employed to accelerate the action of ozone, particularly where the process of this invention is incorporated in the continuous production of film.

The following examples illustrate the preferred practice of this invention, reference being had to the accompanying drawing wherein is shown diagrammatically an arrangement of apparatus used in carrying out the process of this invention.

Referring to the drawing, molten polyethylene, at a temperature of 265° C., was extruded in the form of a film F from extrusion hopper 1 into the air gap surrounded by an enclosure constituting a treating chamber 2, the walls of which are formed in part, at least, of transparent material (quartz glass) to provide for the transmission therethrough of ultra-violet light emitted from mercury arc lamps 3 placed two inches from the film. The upper end of the chamber was closed by the extrusion hopper, and the bottom of the chamber was sealed from the atmosphere by projecting the sides thereof below the surface of the cooling liquid (60° C.) in the quench bath 4. The length of the air gap was 10 inches, and the path of travel of the film in the quench bath was also 10 inches. Air at atmospheric pressure and containing ozone was passed into the chamber at 5 and out at 6. At no time did the temperature of film in chamber 2 drop below 200° C. The treatment times set forth in the following table are the actual times that any given increment of the film remained in the treating chamber and in the quench bath.

*Table*

| Example | Composition of Quench Bath (Conditioning Agent) | Temp. of Quench Bath, °C. | Ozone Concentration, Percent | Time in Air Gap (seconds) | Time in Quench Bath (seconds) | Printability |
|---|---|---|---|---|---|---|
| 1 | 0.24% Hydrogen Peroxide. | 60 | .1 | 1.06 | 1.06 | Excellent. |
| 2 | 3.57% Hydrogen Peroxide. | 60 | .1 | 1.01 | 1.01 | Do. |
| 3 | 31.8% Hydrogen Peroxide. | 45 | .1 | .98 | .98 | Do. |
| 4 | ____do____ | 90 | .1 | .75 | .75 | Do. |
| 5 | 30% Sodium Hypochlorite. | 30 | .1 | 1.06 | 1.06 | Do. |
| 6 | ____do____ | 90 | .1 | .85 | .85 | Do. |
| 7 | Conc. HNO$_3$ | 60 | .1 | .75 | .75 | Do. |
| 8 | Mixed Conc. H$_2$SO$_4$, HNO$_3$ 1/3. | 60 | .1 | .52 | .52 | Do. |

In evaluating the printability, i. e., the strength of the adhesive bond between the dried ink and the treated polyethylene film surface, a number of tests were employed (5 in all); and, on the basis of the results of all of the tests, the films were rated either acceptable or not acceptable and, if acceptable, either excellent or good. Four different inks were employed to print the treated surfaces of polyethylene films, and each printed sample was evaluated in accordance with each of the five tests which will be described hereinafter. The inks employed were as follows:

No. 1—Aniline Cellophane Ink (Bensing Bros. and Deeney, No. W–400).

No. 2—Aniline Polyethylene Ink (Interchemical Corporation, No. PA-Red).

No. 3—Rotogravure Cellophane Ink (Bensing Bros. and Deeney, No. G–1037).

No. 4—Rotogravure Polyethylene Ink (Interchemical Corporation, IN-Tag-Red, GPA Red).

In preparing the printed samples of polyethylene film, the ink was applied with a commercial ink spreader which comprised a steel rod having fine wire wrapped around the rod. The spreader produced a multiplicity of fine lines. The ink was then dried for three minutes at 70° C. and thereafter permitted to cool to room temperature. Each sample was then tested in accordance with each of the following tests, and the amount of ink rubbed off and/or removed was noted:

1. *Rub test.*—The inked polyethylene surface was rubbed ten times against a hard white paper.

2. *Scratch test.*—The back of a fingernail was rubbed across the inked surface.

3. *Flex test.*—The film was held between thumb and forefinger (2" apart) and flexed vigorously.

4. *Pressure-sensitive tape test.*—A pressure-sensitive tape was pressed against the printed surface, and then pulled off.

5. *Twist test.*—The printed film was folded once and then again in a direction perpendicular to the first fold. The folded ends were then twisted once around and thereafter the film surface was examined for smearing and/or cracking of the dried ink.

Although the present process is employed primarily for treating the surface of a polyethylene film in order to produce a film which may be successfully printed with standard oil or lacquer type inks, e. g., aniline or rotogravure inks employed for printing on cellophane film, the present invention may be employed to modify the surface of a polyethylene film which is to be printed with inks which are especially modified for printing upon a polyethylene film surface. The net result is an even further improvement in the adhesive bonds between the dried ink and the polyethylene film surface. The present invention further provides for the preparation of a polyethylene film which is more readily adherent to metals, papers, and various coatings, such as those of nitrocellulose; polyamides, e. g., polyhexamethylene adipamide, polyhexamethylene sebacamide, N-methoxymethyl polyhexamethylene adipamide and other polyamides defined in U. S. P. 2,430,860, and interpolyamides defined in U. S. P. 2,285,009; polyethylene terephthalate; polyvinyl acetals such as polyvinyl butyral; ethyl cellulose; vinyl acetate-vinyl chloride copolymers; vinylidene chloride copolymers; chlorinated rubbers; etc. Furthermore, polyethylene film treated by the present process is more readily adhered to itself and other base materials by using commercial adhesives, e. g., standard adhesives employed for sealing cellophane.

The process of this invention may also be employed for treating the surface of various films fabricated from copolymers of ethylene with various other polymerizable materials, e. g., isobutylene, vinyl acetate, styrene, vinyl chloride.

The outstanding advantage of the present process is that it provides a readily applicable and rapid method of improving the adhesion of a dried printing ink to the surface of a polyethylene film. The process may be readily combined with a necessary step of extruding or calendering molten polyethylene into film or tube form, and the additional apparatus required is inexpensive and easy to install.

An many widely different embodiments may be made without departing from the spirit and scope of this invention, it is to be understood that said invention is in no wise restricted except as set forth in the appended claims.

I claim:

1. A process for treating structures of polyethylene which comprises subjecting said structures to the action of ozone at a temperature of at least 150° C., quenching said structures in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing said structures in an aqueous alkaline bath.

2. The process of claim 1 wherein the action of ozone is carried out in the presence of ultra-violet light having a wave length no greater than 3900 A. U.

3. A process for treating structures of polyethylene which comprises subjecting said structures to the action of ozone at a temperature within the range of from about 150° to about 325° C., quenching said structures in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing said structures in an aqueous alkaline bath.

4. The process of claim 3 wherein the action of ozone is carried out in the presence of ultra-violet light having a wave length no greater than 3900 A. U.

5. A process for treating polyethylene film which comprises subjecting the surface of said film to the action of ozone at a temperature of at least 150° C., quenching the film in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing the film in an aqueous alkaline bath.

6. Polyethylene film when treated in accordance with the process of claim 5.

7. A process for treating polyethylene film which comprises subjecting the surface of said film to the action of ozone at a temperature within the range of from about 150° to about 325° C., quenching the film in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing the film in an aqueous alkaline bath.

8. The process of claim 7 wherein the action of ozone is carried out in the presence of ultra-violet light having a wave length no greater than 3900 A. U.

9. A process for treating polyethylene film which comprises passing continuous polyethylene film continuously through a zone wherein said film is maintained at a temperature of at least 150° C., subjecting the film in said zone to the action of ozone, continuously quenching said film in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing the film in an aqueous alkaline bath.

10. A process for treating polyethylene film which comprises passing continuous polyethylene film continuously through a zone wherein said film is maintained at a temperature within the range of from about 150° to about 325° C., subjecting the film in said zone to the action of ozone, continuously quenching said film in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing the film in an aqueous alkaline bath.

11. The process of claim 10 wherein the action of ozone is carried out in the presence of ultra-violet light having a wave length no greater than 3900 A. U.

12. A process for treating polyethylene film which comprises passing continuous polyethylene film continuously through a zone wherein said film is maintained at a temperature within the range of from about 150° to about 325° C., subjecting the film in said zone to the action of a gaseous atmosphere containing at least 0.05% by volume of ozone as the active ingredient, continuously quenching said film in water containing a conditioning agent selected from the group consisting of hydrogen peroxide, nitrous acid, alkaline hypochlorites, concentrated nitric acid and mixtures of concentrated nitric acid and concentrated sulfuric acid, and thereafter neutralizing the film in an aqueous alkaline bath.

13. The process of claim 12 wherein the water is maintained at a temperature of from about 30° to about 65° C.

14. In the process wherein molten polyethylene is continuously formed into film and the freshly formed film at a temperature of from 150° to 325° C. is continuously passed through a water quench bath, the improvements which comprise subjecting the film prior to quenching to the action of ozone, and incorporating in the quench bath a conditioning agent selected from the group consisting of hydrogen peroxide, nitrous acid, alkaline hypochlorites, concentrated nitric acid and mixtures of concentrated nitric acid and concentrated sulfuric acid, and neutralizing the quenched film in an aqueous alkaline bath.

15. A process for treating polyethylene film which comprises subjecting the surface of said film to the action of ozone at a temperature of at least 150° C., quenching the film in water containing a conditioning agent selected from the group consisting of hydrogen peroxide, nitrous acid, alkaline hypochlorites, concentrated nitric acid and mixtures of concentrated nitric acid and concentrated sulfuric acid, neutralizing said film in an aqueous alkaline solution, and thereafter imprinting such surface with a printing ink.

References Cited in the file of this patent

UNITED STATES PATENTS

| | | |
|---|---|---|
| 2,400,720 | Staudinger | May 21, 1946 |
| 2,499,421 | Samler | Mar. 7, 1950 |
| 2,502,841 | Henderson | Apr. 4, 1950 |
| 2,612,480 | May | Sept. 30, 1952 |
| 2,622,056 | DeCoudres | Dec. 16, 1952 |
| 2,639,998 | Pavlic | May 26, 1953 |